US012533202B2

(12) United States Patent
Upadrasta et al.

(10) Patent No.: US 12,533,202 B2
(45) Date of Patent: Jan. 27, 2026

(54) SYSTEMS AND METHODS FOR REMOTE MENTORING

(71) Applicant: INTUITIVE SURGICAL OPERATIONS, INC., Sunnyvale, CA (US)

(72) Inventors: Prasad V. Upadrasta, San Jose, CA (US); Joey Chau, Cupertino, CA (US); Govinda Payyavula, Sunnyvale, CA (US); Andrea E. Villa, Ben Lomond, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 331 days.

(21) Appl. No.: 18/253,011

(22) PCT Filed: Nov. 15, 2021

(86) PCT No.: PCT/US2021/059315
§ 371 (c)(1),
(2) Date: May 15, 2023

(87) PCT Pub. No.: WO2022/104179
PCT Pub. Date: May 19, 2022

(65) Prior Publication Data
US 2023/0414307 A1    Dec. 28, 2023

Related U.S. Application Data

(60) Provisional application No. 63/114,336, filed on Nov. 16, 2020.

(51) Int. Cl.
*A61B 34/30*    (2016.01)
*A61B 34/00*    (2016.01)
(Continued)

(52) U.S. Cl.
CPC .............. *A61B 34/76* (2016.02); *A61B 34/10* (2016.02); *A61B 34/25* (2016.02); *A61B 34/35* (2016.02); *A61B 2034/102* (2016.02)

(58) Field of Classification Search
USPC .............................. 700/245–264; 606/1, 130
See application file for complete search history.

(56) References Cited

U.S. PATENT DOCUMENTS

| | | | |
|---|---|---|---|
| 6,852,107 B2 * | 2/2005 | Wang ..................... | A61B 34/70 600/407 |
| 7,991,509 B2 * | 8/2011 | Lipow .................... | A61B 34/30 606/1 |

(Continued)

FOREIGN PATENT DOCUMENTS

WO    WO-2019023386 A2 *    1/2019    ............. A61B 34/30

OTHER PUBLICATIONS

International Search Report and Written Opinion for Application No. PCT/US2021/059315, mailed Mar. 14, 2022, 21 pages.

(Continued)

*Primary Examiner* — Jonathan L Sample
(74) *Attorney, Agent, or Firm* — Haynes & Boone, LLP.

(57) ABSTRACT

The primary interface system may include a primary display and a primary input device. The system may also include a secondary interface system. The secondary interface system may include a secondary display and a secondary input device. The system may also include a control system in communication with the primary interface system and the secondary interface system. The control system may include a processing unit including one or more processors. The processing unit may be configured to receive a plurality of teleoperational kinematic constraints for the primary input device and generate a plurality of simulated kinematic constraints, mimicking the teleoperational kinematic constraints, for the secondary input device. The processing (Continued)

system may also be configured to receive guidance information from the secondary input device and provide haptic guidance through the primary input device based on the guidance information.

20 Claims, 7 Drawing Sheets

(51) Int. Cl.
  *A61B 34/10* (2016.01)
  *A61B 34/35* (2016.01)

(56) References Cited

U.S. PATENT DOCUMENTS

| | | | | |
|---|---|---|---|---|
| 8,489,235 | B2 * | 7/2013 | Moll | A61B 34/37 |
| | | | | 700/1 |
| 9,492,927 | B2 * | 11/2016 | Diolaiti | B25J 13/025 |
| 9,867,671 | B2 * | 1/2018 | Kumar | G16H 40/63 |
| 10,507,066 | B2 * | 12/2019 | DiMaio | A61B 34/30 |
| 10,813,710 | B2 * | 10/2020 | Grubbs | G09B 23/285 |
| 11,672,616 | B2 * | 6/2023 | Diolaiti | A61B 34/35 |
| | | | | 606/1 |
| 2003/0013949 | A1 * | 1/2003 | Moll | G09B 23/285 |
| | | | | 600/407 |
| 2006/0178559 | A1 * | 8/2006 | Kumar | G16H 40/63 |
| | | | | 600/109 |
| 2011/0306986 | A1 * | 12/2011 | Lee | A61B 34/37 |
| | | | | 606/130 |
| 2012/0184968 | A1 * | 7/2012 | Schena | A61B 34/37 |
| | | | | 606/130 |
| 2014/0276943 | A1 * | 9/2014 | Bowling | A61B 34/20 |
| | | | | 901/47 |
| 2019/0000576 | A1 * | 1/2019 | Mintz | A61B 90/50 |
| 2019/0125462 | A1 * | 5/2019 | Peine | A61B 34/74 |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2021/059315 mailed May 25, 2023, 13 pages.

* cited by examiner

SYSTEMS AND METHODS FOR REMOTE MENTORING

CROSS-REFERENCE TO RELATED APPLICATIONS

This application is the U.S. National Stage patent application of International Patent Application No. PCT/US2021/059315 filed on Nov. 15, 2021, which claims the benefit of U.S. Provisional Application No. 63/114,336 filed Nov. 16, 2020, each of which is incorporated by reference herein in its entirety.

FIELD

The present disclosure is directed to systems and methods for remote mentoring where operation of the mentor interface system is constrained by kinematic constraints on the mentee interface system.

BACKGROUND

Teleoperational robotic or robot-assisted systems include manipulation assemblies that may be remotely controlled from a primary interface system. Systems and methods for training, mentoring, or advising an operator of the primary interface system may be limited because the sensory information available to the mentor providing the guidance may be incomplete. Accordingly, it would be advantageous to provide improved methods and systems for providing remote guidance where the mentor receives sensory information and experiences sensory constraints similar to those experienced by the operator of the primary interface system.

SUMMARY

The embodiments of the invention are best summarized by the claims that follow the description.

Consistent with some embodiments, a system may comprise a primary interface system. The primary interface system may include a primary display and a primary input device. The system may also include a secondary interface system. The secondary interface system may include a secondary display and a secondary input device. The system may also include a control system in communication with the primary interface system and the secondary interface system. The control system may include a processing unit including one or more processors. The processing unit may be configured to receive a plurality of teleoperational kinematic constraints for the primary input device and generate a plurality of simulated kinematic constraints, mimicking the teleoperational kinematic constraints, for the secondary input device. The processing system may also be configured to receive guidance information from the secondary input device and provide haptic guidance through the primary input device based on the guidance information.

In some embodiments, a method of operating a tele-mentoring system may comprise receiving a plurality of teleoperational kinematic constraints for a primary input device and generating a plurality of simulated kinematic constraints, mimicking the teleoperational kinematic constraints, for a secondary input device. The method may also include receiving guidance information from the secondary input device and providing haptic guidance through the primary input device based on the guidance information.

In some embodiments, a system may comprise a primary interface system. The primary interface system may include a primary display and a primary input device. The primary interface system may include a coupled state wherein the primary interface system is coupled to a teleoperational manipulator to control motion of a surgical instrument and including a decoupled state wherein the primary interface system is decoupled from the teleoperational manipulator. The system may also include a secondary interface system. The secondary interface system may include a secondary display and a secondary input device. The system may also include a control system in communication with the primary interface system and the secondary interface system. The control system may include a processing unit including one or more processors. The processing unit may be configured to receive a plurality of kinematic constraints for the secondary interface system, generate guidance information from the secondary interface system, and provide haptic guidance through the primary input device based on the guidance information. The haptic guidance may be provided while the primary interface system is in the decoupled state.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

Figure 1:
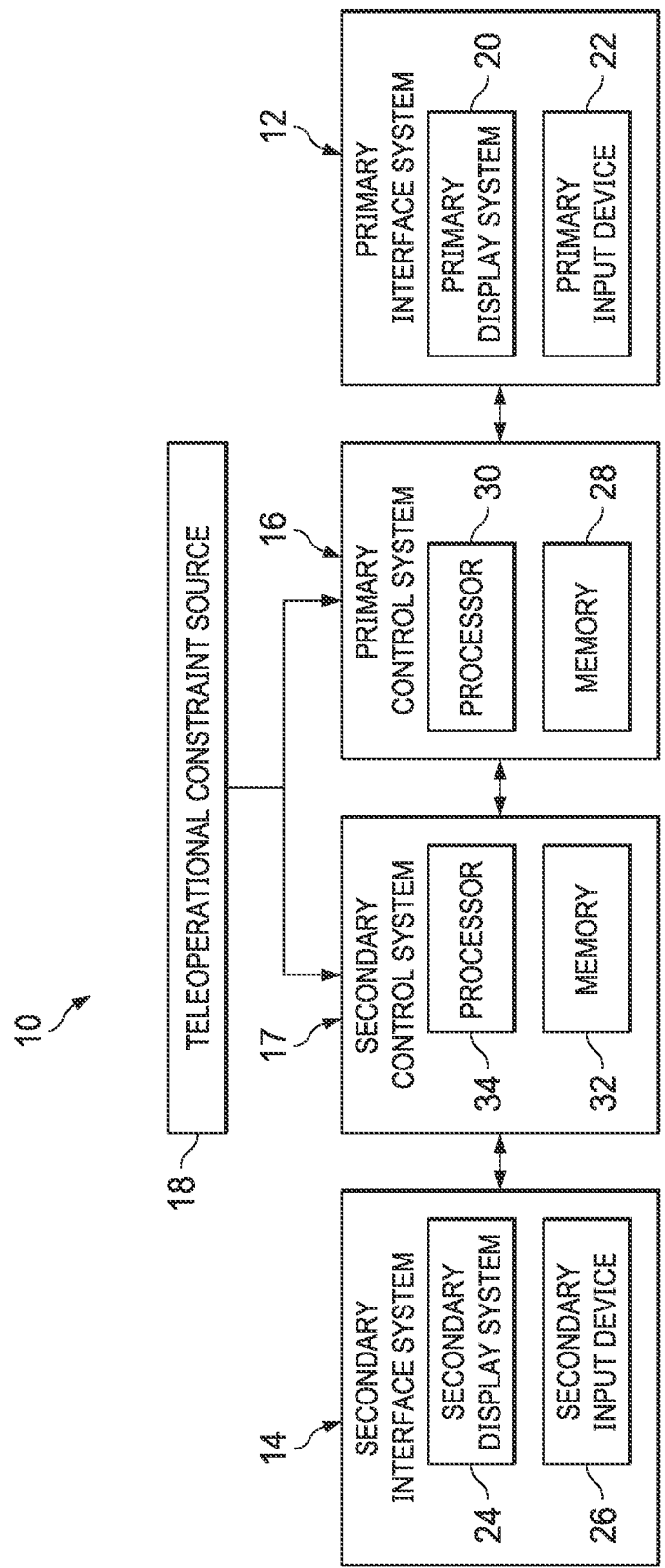
FIG. 1 is a schematic view of tele-mentoring system according to some embodiments.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 provides a schematic view of a tele-mentoring system 10 for mentoring, training, evaluating, assisting, guiding, advising or otherwise monitoring an operator during a teleoperational procedure, including a live patient procedure, a training procedure, a simulation procedure or other guidance procedure. The tele-mentoring system 10 includes a primary interface system 12, a secondary interface system 14, a primary control system 16, a secondary control system 17, and a teleoperational constraint source 18. The primary interface system 12 may be in a different environment, remote from the secondary interface system 14, including a different area of common surgical environment, a different room, a different building, a different city, or a different country.

The primary interface system 12 allows a surgeon or other operator of the primary interface system 12 to view images of or representing the surgical site and to control the operation of a teleoperational medical instrument system and/or an endoscopic imaging system. The primary interface system 12 may include a primary display system 20 that displays primary image data for conducting the teleoperational procedure, including endoscopic images from within a patient anatomy, guidance information from the secondary interface system, patient information, and procedure planning information. The primary interface system 12 also includes a primary input device 22 that controls a teleoperational manipulator in manipulating the teleoperational medical instrument system and/or the endoscopic imaging system. The primary input device 22 may be movable with a plurality of degrees of freedom, typically with six degrees of freedom, three rotational degrees of freedom and three translational degrees of freedom. This allows the primary input device 22 to be moved to any position and any orientation within its range of motion. The control device(s) may include one or more of any number of a variety of input devices, such as hand-gripped manipulation devices, joysticks, trackballs, data gloves, trigger-guns, foot pedals, hand-operated controllers, voice recognition devices, touch screens, body motion or presence sensors, and other types of input devices.

The secondary interface system 14 (also referred to as a mentor interface system) allows a mentor, instructor, or other advisor at the secondary interface system 14 to receive visual, auditory, and/or tactile sensory information and to experience sensory constraints similar to those experienced by the operator of the primary interface system 12. More specifically, constraints on the primary interface system 12 may be imposed on the secondary interface system 14 so that the mentor's experience and the guidance generated by the mentor are subject to the same constraints as the operator of the primary interface system 12. The secondary interface system 14 may include a secondary display system 24 that displays all or some of the imaging information displayed on the primary display system 20, including endoscopic imaging information from within a patient anatomy, guidance information generated from the secondary interface system, patient information, and procedure planning information. In some embodiments, the images displayed on the display system 24 may be the same as those displayed on the display system 20, including high definition, video stereo-endoscopic images of the procedure environment, such as inside the patient anatomy during a surgical procedure. In other embodiments, such as when the secondary interface system 14 is at a location remote from the location of the primary interface system 12, communication bandwidth constraints may drive the use of lower bandwidth image data at the secondary interface system 14 as compared to the higher bandwidth image data used at the primary interface system 12. For example, the images displayed on the secondary display system 24 may be in a different format, such as low-resolution video, two-dimensional images, or still images, as compared to the images displayed on the primary display system 20 which may be high definition video stereo-endoscopic images. In some embodiments, the image on the secondary display system 24 may be virtually generated or re-created from position, orientation, movement, and environmental information received from the primary interface system 12 and/or the teleoperational manipulator system controlled by the primary interface system 12.

The secondary interface system 14 also includes a secondary input device 26 that can be moved by the mentor to generate guidance for the operator of the primary interface system 12. The mentor may manipulate the input device 26, while or after viewing the secondary display system 24, to perform a procedure, a technique, a corrective action, or other movements that may guide or instruct the operator of the primary interface system 12. The mentor's manipulation of the input device 26 may simulate control of the primary interface system 12 and the corresponding movements of the teleoperational instruments controlled by the primary interface system 12. In some examples, the secondary input device 26 may be similar or identical to the primary input device 22. In other examples, the secondary input device 26 may take a different form from the primary input device 22 but may provide the same translational and rotational range of motion. In other examples, the secondary input device 26 may have more or fewer degrees of freedom than the primary input device 22. As explained below, the range of motion of the secondary input device 26 may be constrained by the primary input device 22 and the teleoperational constraint source 18.

The primary control system 16 includes at least one memory 28 and a processing unit including at least one processor 30 for effecting communication, control, and image data transfer between the primary interface system 12, the secondary interface system 14, and the teleoperational constraint source 18. Any of a wide variety of centralized or distributed data processing architectures may be employed in the control system 16. Similarly, the programmed instructions may be implemented as a number of separate programs or subroutines, or they may be integrated into a number of other aspects of the systems described herein, including teleoperational systems. In one embodiment, the control system 16 may support any of a variety of wired communication protocols or wireless communication protocols such as Bluetooth, IrDA, HomeRF, IEEE 802.11, DECT, and Wireless Telemetry.

The secondary control system 17 includes at least one memory 32 and a processing unit including at least one processor 34 for effecting communication, control, and image data transfer between the primary interface system 12, the secondary interface system 14, and the teleoperational constraint source 18. Any of a wide variety of centralized or distributed data processing architectures may be employed in the control system 17. Similarly, the programmed instructions may be implemented as a number of separate programs or subroutines, or they may be integrated into a number of other aspects of the systems described herein, including teleoperational systems. In one embodiment, the control system 17 may support any of a variety of wired communication protocols or wireless communication protocols such as Bluetooth, IrDA, HomeRF, IEEE 802.11, DECT, and Wireless Telemetry.

In some embodiments, the primary control system 16 may be a component of and/or may be located proximate to the primary interface system 12. For example, the control system 16 may be in the same room or the same building as the primary interface system 12. In some embodiments, the secondary control system 17 may be a component of and/or may be located proximate to the secondary interface system 14. For example, the control system 17 may be in the same room or the same building as the secondary interface system 14. The primary control system 16 and the secondary control system 17 may communicate data, including control signals, image data, audio data, or any other information generated by or used by the respective interface systems. For example, the primary control system 16 may receive kinematic constraint parameters such as manipulator constraints, instrument constraints, or environmental constraints from a teleoperational manipulator assembly (e.g., a teleoperational constraint source 18) and may send the kinematic constraint parameters, including any kinematic constraint parameters for the primary control system itself (e.g., position/orientation of the primary input devices), to the secondary control system 17. The secondary control system 17 may use the received constraint parameters to generate haptic forces to apply to secondary input device 26 of the secondary interface system 14.

In some embodiments, the primary and secondary control systems may be a single control system located proximate to the primary interface system, proximate to the secondary interface system, or at a location remote from both the primary and secondary interface systems. In some embodiments, control system components used to effect communication, control, and image data transfer between the primary interface system 12, the secondary interface system 14, and the teleoperational constraint source 18 may be distributed over one or more locations. In some embodiments, the teleoperational constraint source 18 may provide kinematic constraints to the primary and secondary interface systems 12, 14 either directly or via the control systems 16, 17. In various embodiments, the teleoperational constraint source 18 may be an operational source such as a teleoperational assembly including one or more teleoperational manipulators to which medical instruments or endoscopic instruments are coupled for performing a medical procedure on a live or simulated patient in response to control signals from the primary or secondary interface systems in real time or in the presence of a patient anatomy. Kinematic constraints for an operational source may be generated from structural kinematic information such as the dimensions of the components of the teleoperational assembly and/or medical instruments, joint arrangement, component position information, component orientation information, and/or port placements. Additionally or alternatively, kinematic constraints for an operational source may be generated from dynamic kinematic information such as the range of motion of joints in the teleoperational assembly, velocity or acceleration information, and/or resistive forces. The structural or dynamic kinematic constraint information may be generated by sensors in the teleoperational assembly that measure, for example, manipulator arm configuration, medical instrument configuration, joint configuration, component displacement, component velocity, and/or component acceleration. Sensors may include position sensors such as electromagnetic (EM) sensors, shape sensors such as fiber optic sensors, and/or actuator position sensors such as resolvers, encoders, and potentiometers. Kinematic constraints may also include environmental constraints such as tool tip engagement with tissue or current position of primary input devices. Environmental constraints may be detected, for example, by sensors at the primary interface system or by sensing instruments such as force, temperature, or other environmental sensors. In some embodiments, the teleoperational constraint source 18 may include a teleoperational manipulator assembly (e.g., teleoperational assembly 102) that is operated by commands generated by a primary interface system (e.g., primary interface system 104). In some embodiments, the teleoperational constraint source 18 may include the primary interface system.

Additionally or alternatively, the teleoperational constraint source 18 may be a model source such as a pre-recorded procedure or a simulation of a procedure. The kinematic constraints may be generated from the model based on simulated or pre-recorded structural or dynamic kinematic information from the model or from virtual instruments used within the pre-recorded procedure or simulation of a procedure. Additionally or alternatively, the teleoperational constraint source 18 may be a teleoperational manipulator simulator.

In use, the tele-mentoring system 10 allows the mentor at the secondary interface system 14 to experience kinematic constraints and imaging information that mimic the kinematic constraints and imaging information experienced by the operator of the primary interface system. Structural and dynamic kinematic constraints experienced at the primary input device 22 based on the teleoperational constraint source 18 may include set-up joint constraints for a teleoperational manipulator assembly, instrument constraints that are unique to a particular instrument or a type of instrument, and/or environmental constraints which may be detected, for example, by sensing instruments such as force, temperature, or other environmental sensors. The structural and dynamic kinematic constraints experienced at the primary input device 22 based on the teleoperational constraint source 18 may also be imposed or simulated at the secondary input device 26 at the secondary interface system 14. More specifically, the secondary control system 17 may generate haptic feedback for the mentor at the secondary interface system 14 from the structural and/or dynamic kinematic constraints received from the teleoperational constraint source 18 (optionally received via the primary control system 16) Thus, guidance generated by the mentor, in the form of recorded movements of the secondary input device 26, are subject to the same constraints as the primary input device 22. As the mentor views images on the secondary display system 24 that are the same as or similar to the images on the primary display system 20, the mentor may move the secondary input device 26 to simulate the performance of a medical procedure, a corrective action, a training technique, an exploration, or other action. The movements of the secondary input device 26 may be recorded as mentor guidance. The mentoring guidance may be communicated, for example through the secondary control system 17 to the primary control system 16 and from the primary control system 16 to the primary interface system 12. At the primary interface system 12, the mentor guidance information is used to generate haptic guidance at the primary input device 22. The haptic guidance may include movements of the primary input device 22 that replicate the movements of the secondary input device 26. The haptic guidance at the primary interface system 12 may be generated while the primary interface system is in an instruction mode where the primary input device 22 is in a decoupled state decoupled from the teleoperational assembly so that movement of the primary input device 22 does not cause motion of the teleoperational assembly and medical instrument in the patient environment. The mentor guidance information may include guidance displayed on the display system 20 with virtual or "ghosted" instrument motion. The operator of the primary interface system may engage (e.g., grip, hold, manipulate) the primary input device 22 as the haptic guidance is delivered so that the operator's hands experience the guided movement of the input device 22 without causing movement of the teleoperational instrument. In some embodiments, after being trained by the haptic guidance in the instruction mode, the operator of the primary input device 22 may switch to an instrument following mode in which the movement of the primary input device 22 causes corresponding motion of the teleoperational assembly and the medical instrument in the patient environment. In the instrument following mode, the operator may replicate the motions and trajectory of the haptic guidance by controlling the primary input device 22 to perform the instructed procedure on the patient. In some embodiments, the operator may switch to the instrument following mode and the primary input device 22 will be controlled by the primary control system 16 to replicate the motions and trajectory of the haptic guidance. When the primary control system 16 drives the motion of the primary input device 22, safety precautions may be implemented to ensure that the operator of the primary interface system 12 is observing the procedure and has the ability to abort the automated procedure or assume control of the primary input device 22 at any time.

Figure 2:
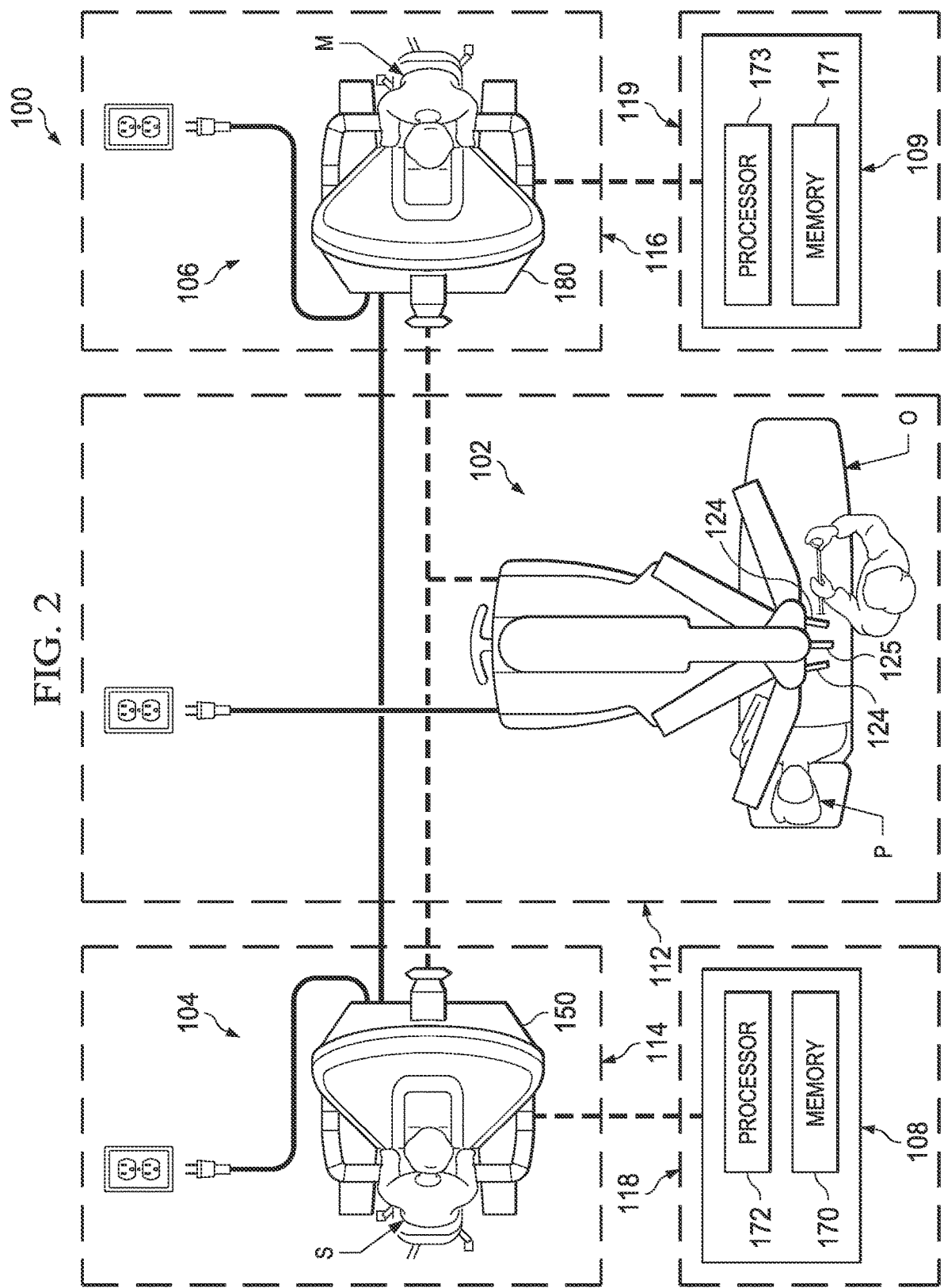
FIG. 2 is an illustration of a tele-mentoring system according to some embodiments.

FIG. 2 illustrates a tele-mentoring medical system 100 that may be used in, for example, medical procedures including diagnostic, therapeutic, or surgical procedures. In one or more embodiments, the system 100 may be a teleoperational medical system that is under the teleoperational control of a surgeon. In alternative embodiments, the medical system 100 may be under the partial control of a computer programmed to perform the medical procedure or sub-procedure. In still other alternative embodiments, the medical system 100 may be a fully automated medical system that is under the full control of a computer programmed to perform the medical procedure or sub-procedure with the medical system 100. One example of the medical system 100 that may be used to implement the systems and techniques described in this disclosure is the da Vinci® Surgical System manufactured by Intuitive Surgical Operations, Inc. of Sunnyvale, California.

The medical system 100 includes a teleoperational assembly 102 (e.g., a type of teleoperational constraint source 18), a primary interface system 104 (e.g., the primary interface system 12), a secondary interface system 106 (e.g., the secondary interface system 14), a primary control system 108 (e.g., the primary control system 16), and a secondary control system 109 (e.g., the secondary control system 17). The teleoperational assembly 102 may be mounted to or positioned near an operating table O on which a patient P is positioned. The assembly 102 may be referred to as a patient side cart, a surgical cart, a surgical robot, a manipulating system, and/or a teleoperational arm cart.

The teleoperational assembly 102 may be located in an environment 112. The primary interface system 104 may be located in an environment 114. The secondary interface system may be located in an environment 116. The primary control system 108 may be located in an environment 118. The secondary control system 109 may be located in an environment 119. In some embodiments, the environment 112 may be a medical environment such as an operating room. In other embodiments, the medical environment may be an emergency room, a medical training environment, a medical laboratory, or some other type of environment in which any number of medical procedures or medical training procedures may take place. The environment 114 may be in the environment 112, in another room in a common facility with environment 112, or in another geographic location. The environment 116 may be in the environment 112 or the environment 114, in another room in a common facility with environment 112 or 114, or in another geographic location. The environment 118 may be in the environment 112 or 114; in another room in a common facility with environment 112 or 114; or in another geographic location. The environment 119 may be in the environment 112 or 116; in another room in a common facility with environment 112 or 116; or in another geographic location. In some embodiments, the primary and secondary control systems may be a single control system located proximate to the primary interface system, proximate to the secondary interface system, or at a location remote from both the primary and secondary interface systems. In some embodiments, control system components used to effect communication, control, and image data transfer between the primary interface system 104, the secondary interface system 106, and the teleoperational assembly 102 may be distributed over one or more locations.

Figure 3:
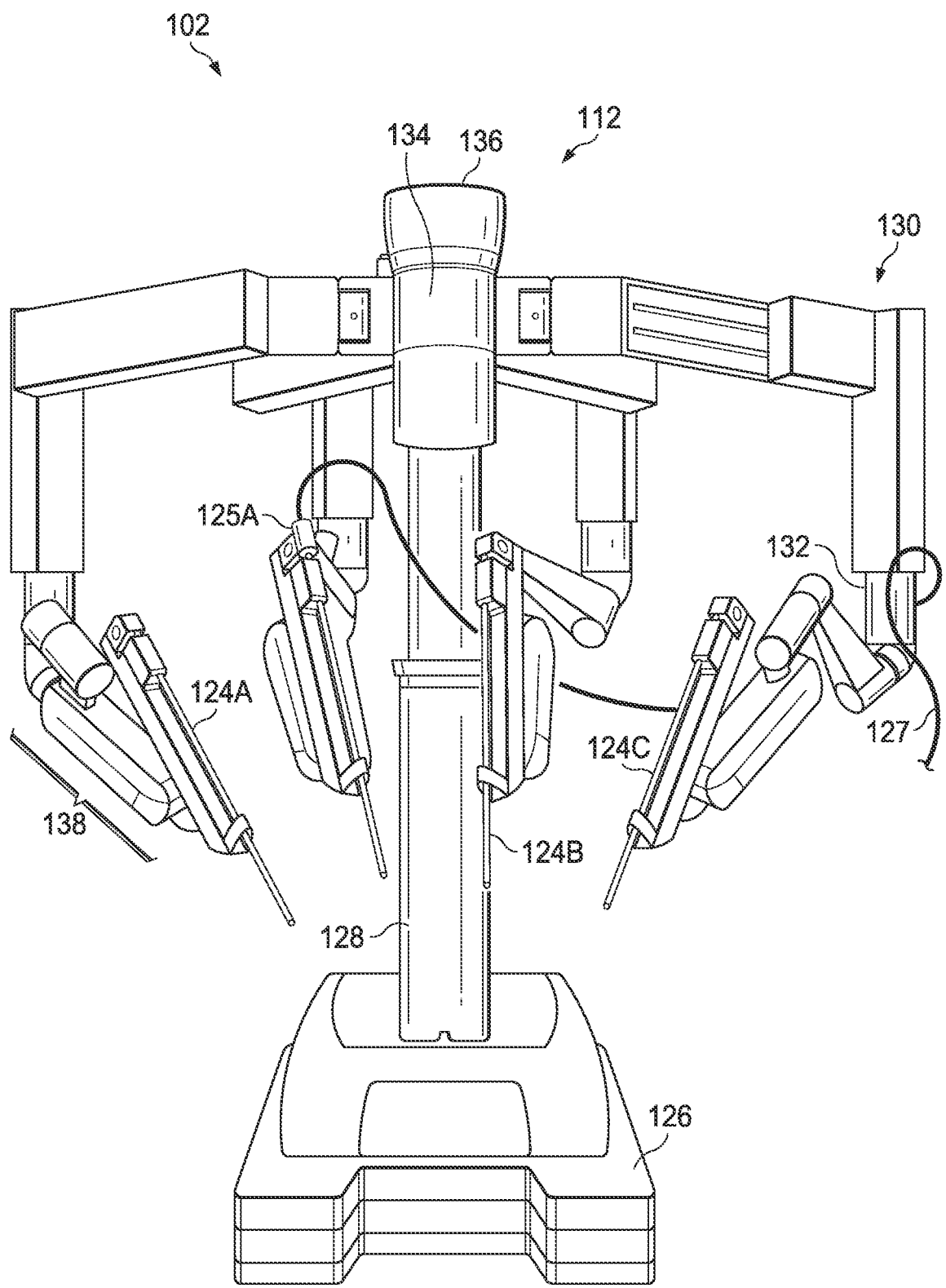
FIG. 3 is a perspective view of a teleoperational assembly according to some embodiments.

With further reference to FIG. 3, one or more medical instrument systems 124 and an endoscopic imaging system 125 are operably coupled to the assembly 102. The medical instrument system 124 may comprise one or more medical instruments. In embodiments in which the medical instrument system 124 comprises a plurality of medical instruments, the plurality of medical instruments may include multiple of the same medical instrument and/or multiple different medical instruments. Similarly, the endoscopic imaging system 125 may comprise one or more endoscopes. In the case of a plurality of endoscopes, the plurality of endoscopes may include multiple of the same endoscope and/or multiple different endoscopes. The assembly 102 supports and manipulates the medical instrument system 124 while a surgeon S views the surgical site through the primary interface system 104. An image of the surgical site may be obtained by the endoscopic imaging system 125, which may be manipulated by the assembly 102. The number of medical instrument systems 124 used at one time will generally depend on the diagnostic or surgical procedure to be performed and on space constraints within the operating room, among other factors. The assembly 102 may include a kinematic structure of one or more non-servo controlled links (e.g., one or more links that may be manually positioned and locked in place, generally referred to as a manipulator support structure) and a manipulator. The assembly 102 includes a plurality of motors that drive inputs on the medical instrument system 124. In an embodiment, these motors move in response to commands from a control system (e.g., primary control system 108). The motors include drive systems which when coupled to the medical instrument system 124 may advance a medical instrument into a naturally or surgically created anatomical orifice. Other motorized drive systems may move the distal end of said medical instrument in multiple degrees of freedom, which may include three degrees of linear motion (e.g., linear motion along the X, Y, Z Cartesian axes) and three degrees of rotational motion (e.g., rotation about the X, Y, Z Cartesian axes). Additionally, the motors may be used to actuate an articulable end effector of the medical instrument for grasping tissue in the jaws of a biopsy device or the like. Medical instruments of the medical instrument system 124 may include end effectors having a single working member such as a scalpel, a blunt blade, an optical fiber, or an electrode. Other end effectors may include, for example, forceps, graspers, scissors, or clip appliers.

The assembly 102 shown provides for the manipulation of three medical instruments 124a, 124b, and 124c and an endoscopic imaging device 125a, such as a stereoscopic endoscope used for the capture of images of the site of the procedure. The imaging device 125a may transmit signals over a cable 127 to the primary control system 108. The imaging device 125a and the medical instrument 124a-c can be positioned and manipulated through incisions in the patient so that a kinematic remote center is maintained at the incision to minimize the size of the incision. Images of the surgical site can include images of the distal ends of the medical instruments 124a-c when they are positioned within the field-of-view of the imaging device 125a. The imaging device 125a and the medical instruments 124a-c may each be therapeutic, diagnostic, or imaging instruments.

The assembly 102 includes a drivable base 126. The drivable base 126 is connected to a telescoping column 128, which allows for adjustment of the height of arms 130. The arms 130 may include a rotating joint 132 that both rotates and moves up and down. Each of the arms 130 may be connected to an orienting platform 134 that is capable of 360 degrees of rotation. The assembly 102 may also include a telescoping horizontal cantilever 136 for moving the orienting platform 134 in a horizontal direction.

In the present example, each of the arms 130 connects to a manipulator arm 138. The manipulator arms 138 may connect directly to a medical instrument, 124a-c. The manipulator arms 138 may be teleoperable. In some examples, the arms 138 connecting to the orienting platform 134 may not be teleoperable. Rather, such arms 138 may be positioned as desired before the surgeon S begins operation with the teleoperative components. Throughout a surgical procedure, medical instruments may be removed and replaced with other instruments such that instrument to arm associations may change during the procedure.

Endoscopic imaging system 125a may be provided in a variety of configurations including rigid or flexible endoscopes. Rigid endoscopes include a rigid tube housing a relay lens system for transmitting an image from a distal end to a proximal end of the endoscope. Flexible endoscopes transmit images using one or more flexible optical fibers. Digital image-based endoscopes have a "chip on the tip" design in which a distal digital sensor such as a one or more charge-coupled device (CCD) or a complementary metal oxide semiconductor (CMOS) device store image data. Endoscopic imaging systems may provide two- or three-dimensional images to the viewer. Two-dimensional images may provide limited depth perception. Three-dimensional stereo endoscopic images may provide the viewer with more accurate depth perception. Stereo endoscopic instruments employ stereo cameras to capture stereo images of the patient anatomy. An endoscopic instrument may be a fully sterilizable assembly with the endoscope cable, handle, and shaft all rigidly coupled and hermetically sealed.

Figure 4:
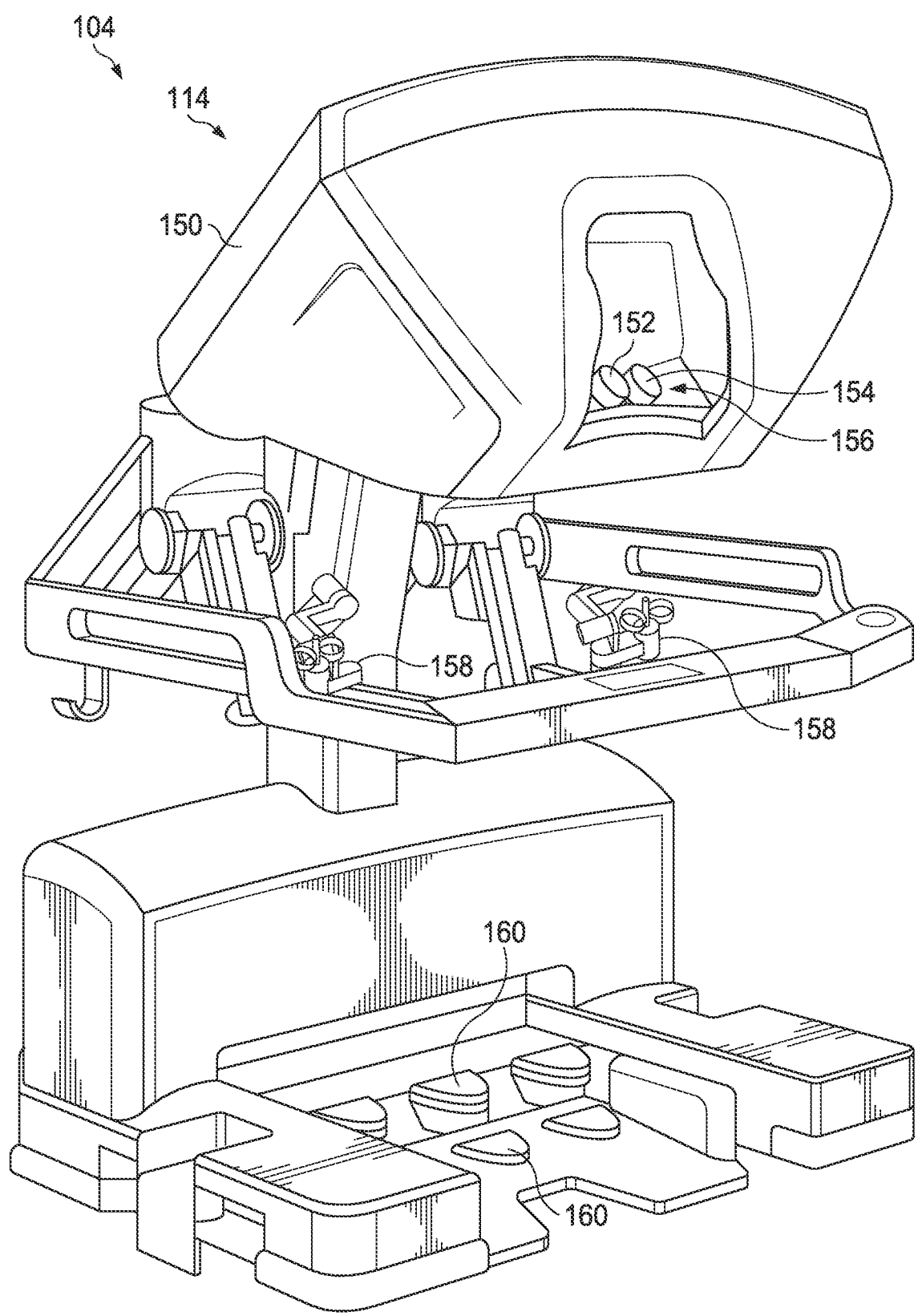
FIG. 4 is a perspective view of a primary interface system according to some embodiments.

With reference to FIG. 4, the primary interface system 104 allows a surgeon S or other type of clinician to view images of or representing the surgical site and to control the operation of the medical instrument system 124 and/or the endoscopic imaging system 125. The primary interface system 104 may be located at a surgeon's control console 150. In one or more embodiments, the primary interface system 104 may be referred to as an operator interface system, an operator input system, a user control system, a user input system, or the like. The primary interface system 104 includes a left eye display 152 and a right eye display 154 for presenting the surgeon S with a coordinated stereo view of the surgical environment that enables depth perception. The left and right eye displays 152, 154 may be components of a display system 156. In other embodiments, the display system 156 may include one or more other types of displays.

The primary interface system 104 further includes one or more primary input devices 158, which in turn cause the assembly 102 to manipulate one or more instruments of the endoscopic imaging system 125 and/or the medical instrument system 124. The control device(s) may include one or more of any number of a variety of input devices, such as hand-gripped manipulation devices, joysticks, trackballs, data gloves, trigger-guns, foot pedals, hand-operated controllers, voice recognition devices, touch screens, body motion or presence sensors, and other types of input devices.

Each primary input device 158 may be movable within the environment 114 with a plurality of degrees of freedom, typically with six degrees of freedom, three rotational degrees of freedom and three translational degrees of freedom. This allows the primary input device 158 to be moved to any position and any orientation within its range of motion.

The kinematic range of motion and kinematic constraints associated with the medical instrument system 124, the imaging system 125, and the assembly may be provided through the primary input devices 158. The primary input devices 158 can provide the same Cartesian degrees of freedom as their associated instruments to provide the surgeon S with telepresence, or the perception that the primary input devices 158 are integral with said instruments so that the surgeon has a strong sense of directly controlling the instruments. Therefore, the degrees of freedom of each primary input device 158 are mapped to the degrees of freedom of each primary input device's 158 associated instruments (e.g., one or more of the instruments of the endoscopic imaging system 125 and/or the medical instrument system 124.). To this end, position, force, and tactile feedback sensors (not shown) may be employed to transmit position, force, and tactile sensations from the medical instruments, e.g., the medical instruments 124a-c or the imaging device 125a, back to the surgeon's hands through the primary input devices 158. Additionally, the arrangement of the medical instruments 124a-c may be mapped to the arrangement of the surgeon's hands and the view from the surgeon's eyes so that the surgeon has a strong sense of directly controlling the instruments. Input control devices 160 are foot pedals that receive input from a user's foot.

Referring again to FIG. 2, the medical system 100 also includes the primary control system 108. The primary control system 108 includes at least one memory 170 and at least one processor 172 for effecting control between the medical instrument system 124, the primary interface system 104, and other auxiliary systems which may include, for example, imaging systems, audio systems, fluid delivery systems, display systems, illumination systems, steering control systems, irrigation systems, and/or suction systems. Though depicted as being external to the assembly 102, the primary control system 108 may, in some embodiments, be contained wholly within the assembly 102. The primary control system 108 also includes programmed instructions (e.g., stored on a non-transitory, computer-readable medium) to implement some or all of the methods described in accordance with aspects disclosed herein. While the primary control system 108 is shown as a single block in the simplified schematic of FIG. 2, the primary control system 108 may include two or more data processing circuits with one portion of the processing optionally being performed on or adjacent the assembly 102, another portion of the processing being performed at the primary interface system 104, and the like.

The medical system 100 also includes the secondary control system 109. The secondary control system 109 includes at least one memory 171 and at least one processor 173 for effecting control between the medical instrument system 124, the secondary interface system 106, and/or other auxiliary systems which may include, for example, imaging systems, audio systems, fluid delivery systems, display systems, illumination systems, steering control systems, irrigation systems, and/or suction systems. The secondary control system 109 may, in some embodiments, be a component of the secondary interface system 106. The secondary control system 109 also includes programmed instructions (e.g., stored on a non-transitory, computer-readable medium) to implement some or all of the methods described in accordance with aspects disclosed herein. While the secondary control system 109 is shown as a single block in the simplified schematic of FIG. 2, the secondary control system 109 may include two or more data processing circuits with one portion of the processing optionally being performed on or adjacent the assembly 102, another portion of the processing being performed at the secondary interface system 106, and the like.

Any of a wide variety of centralized or distributed data processing architectures may be employed. Similarly, the programmed instructions may be implemented as a number of separate programs or subroutines, or they may be integrated into a number of other aspects of the systems described herein, including teleoperational systems. In one embodiment, the control systems 16, 17 supports wireless communication protocols such as Bluetooth, IrDA, HomeRF, IEEE 802.11, DECT, and Wireless Telemetry.

In some embodiments, the primary control system 108 may include one or more servo controllers that receive force and/or torque feedback from the medical instrument system 124. Responsive to the feedback, the servo controllers transmit signals to the primary interface system 104. The servo controller(s) may also transmit signals instructing assembly 102 to move the medical instrument system(s) 124 and/or endoscopic imaging system 125 which extend into an internal surgical site within the patient body via openings in the body. Any suitable conventional or specialized servo controller may be used. A servo controller may be separate from, or integrated with, assembly 102. In some embodiments, the servo controller and assembly 120 are provided as part of a assembly 102. In some embodiments, the secondary control system 109 may include a virtual servo control system responsive to received kinematic constraints from the teleoperational constraint source, including kinematic constraints from a model teleoperational manipulator assembly and a model patient environment.

The primary control system 108 can be coupled with the endoscopic imaging system 125 and can include a processor to process captured images for subsequent display, such as to a surgeon on the surgeon's control console, or on another suitable display located locally and/or remotely. For example, where a stereoscopic endoscope is used, the primary control system 108 can process the captured images to present the surgeon with coordinated stereo images of the surgical site as a field of view image. Such coordination can include alignment between the opposing images and can include adjusting the stereo working distance of the stereoscopic endoscope.

The secondary interface system 106 may be operated by a mentor M to mentor, train, assist, guide, or otherwise advise the operator of the primary interface system 104 in the performance of a patient medical procedure, a simulation procedure, a training procedure or other operation performed by the surgeon S via the primary interface system 104. In some examples, the secondary interface system 106 may be substantially similar to the primary interface system 104, providing some or all of the visual and tactile information to the mentor M at the secondary interface system 106 that the surgeon S receives at the primary interface system 104. The secondary interface system 106 may be located at a control console 180 including eye displays and input devices the same as or similar to those at the surgeon's control console 15. In other examples, the secondary interface system 106 may be a simplified interface system providing a display system such as a computer monitor, a laptop display, a tablet display, a mobile communication device or any other display system capable of displaying two or three-dimensional image data. The simplified interface system may also provide an input control device in the form of, for example, a mouse, hand grips, joysticks, trackballs, data gloves, trigger-guns, foot pedals, hand-operated controllers, touch screens or other input control devices that match all or fewer than all of the degrees of freedom of the primary input devices 158 of the primary interface system 104.

Figure 5:
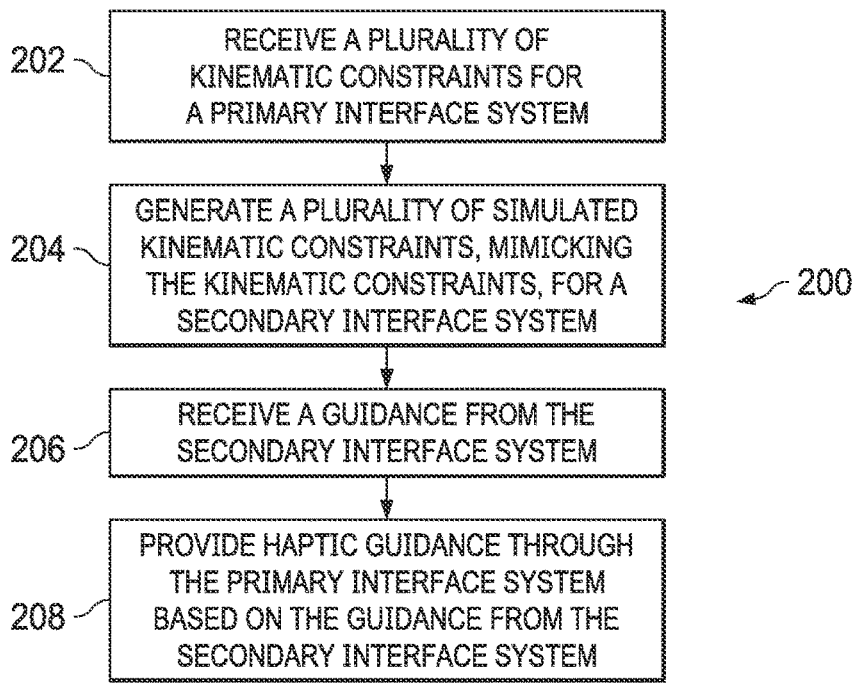
FIG. 5 is a flowchart illustrating a method for providing guidance to an operator of a primary interface system according to some embodiments.

FIG. 5 is a flowchart illustrating a method 200 for providing guidance to an operator of a primary interface system according to some embodiments. The methods described herein are illustrated as a set of operations or processes and are described with continuing reference to the preceding figures. Not all of the illustrated processes may be performed in all embodiments of the methods. Additionally, one or more processes that are not expressly illustrated in may be included before, after, in between, or as part of the illustrated processes. In some embodiments, one or more of the processes may be implemented, at least in part, in the form of executable code stored on non-transitory, tangible, machine-readable media that when run by one or more processors (e.g., the processors of a control system) may cause the one or more processors to perform one or more of the processes. In one or more embodiments, the processes may be performed by any of the control systems 16, 17, 108, 109.

The method 200 may be performed using a tele-mentoring system (e.g., tele-mentoring system 10, 100) allowing the mentor at a secondary interface system (e.g., secondary interface system 14, 106) to experience kinematic constraints and imaging information that mimic the kinematic constraints and imaging information experienced by the operator of the primary interface system (e.g. primary interface system 12, 104). At a process 202, a plurality of kinematic constraints is received from a teleoperational constraint source (e.g. source 18), such as a teleoperational assembly 102 or a simulation source. The kinematic constraints may be generated by the structural and dynamic kinematic range of the teleoperational assembly and any medical instruments and/or endoscopic instruments attached thereto and may bound the range of motion available to the primary input devices 22, 158. The kinematic constraints may be generated by sensors in the teleoperational assembly that measure the static or dynamic properties of the teleoperational assembly and the connected instruments. The structural and dynamic kinematic constraints are imposed at and constrain the motion and trajectory of the primary input device 22.

At a process 204, a plurality of simulated kinematic constraints are generated for the secondary interface system 14, 106. The simulated kinematic constraints may mimic the kinematic constraints that bound the range of motion available to the primary input devices. For example, the structural and dynamic kinematic constraints imposed at the primary input device 22 based on the teleoperational constraint source 18 may also be imposed or simulated at the secondary input device 26 at the secondary interface system 14. Additionally, the primary control system 16 may receive primary imaging data to display on the primary display and may generate secondary imaging data from the primary imaging data for presentation on the secondary display. For example, the primary control system 108 may receive imaging data from the imaging system 125 and may display the imaging data on the primary display 156. The secondary control system 109 may generate secondary imaging data from the primary imaging data for display on the display system of the secondary interface system 106.

At a process 206, guidance is received from the secondary interface system. For example, as the mentor views images on the secondary display system 24 that are the same as or similar to the images on the primary display system 20, the mentor may move the secondary input device 26 to simulate the performance of a medical procedure, a corrective action, a training technique, an exploration, or other action. The movements of the secondary input device 26 may be recorded as mentor guidance. The mentoring guidance may be communicated, for example through the control systems 16, 17, to the primary interface system 12. The guidance generated by the mentor, in the form of recorded movements, trajectories, or other tracked information of the secondary input device 26, may be subject to the same kinematic constraints as the primary input device 22. The mentor guidance may also include verbal commentary and annotations to the image data. The mentor guidance may be generated by the mentor at the secondary interface system 14 and may be transmitted as control data, image data, and/or audio data to the primary interface system 12 either directly or via the control systems 16, 17. The recorded movements and trajectories may include positions, orientations, spatial displacements, velocities, accelerations, and other parameters associated with the movement of the secondary input device 26 by the mentor. In some embodiments, mentor guidance may be stored, recalled, or deleted from, for example memory 28, 32. The stored instructions may be associated with specific surgical processes and may be recalled for use when the primary interface system is engaged in the specific surgical process. In some embodiments, the guidance may be generated in a low fidelity mode that may include less than the full range of motion available at the primary interface system. For example, the guidance may be provided through a mobile device or based on voice commands that describe motion in less than six degrees of freedom.

At a process 208, haptic guidance is provided through the primary interface system based on the guidance from the secondary interface system. For example, the mentoring guidance generated at the secondary interface system 14 may generate haptic guidance in the form of constrained movements of the primary input device 22 based on the movements of the secondary input device 26. The haptic guidance may include displacements, changes in orientation, trajectories, forces, accelerations, velocities, or other motion parameters delivered through the primary input device 22 that correspond to or match the movements of the secondary input device 26 used to generate the mentor guidance. The operator of the primary interface system 12 may engage (e.g., grip, hold, manipulate) the primary input device 22 as the haptic guidance is delivered allowing the operator's hands to experience the haptic guided movement of the input device 22 without causing movement of the teleoperational instrument. The primary input device 22 may be constrained to move in accordance with the haptic guidance as the operator engages the primary input device and may resist any forces applied by the operator that are contrary to the haptic guidance. For example, the haptic guidance may include constrained trajectory guidance that limits movement of the primary input device 22 within a constrained trajectory of motion. The haptic guidance may train the user to perform the procedure using the same sequence of motions, forces, trajectories, displacements, rotations or other motion parameters provided by the mentor through the secondary interface system 14. After the haptic guidance is delivered via the primary input device 22, the primary input device may be returned to the same position and orientation that it was in prior to initiation of the haptic guidance. In some examples, where the primary input device 22 and the secondary input device 26 have the same structure and configuration, the haptic guidance may be movement of the primary input device 22 that replicates the movement of the secondary input device 26 to achieve the same medical instrument motion. In other examples, where the primary input device 22 and the secondary input device 26 have different structures and configurations, the mentor guidance may be translated to the primary interface system 12 so that the same medical instrument motion achieved by the mentor guidance may be achieved using the secondary input device 26. For example, if the secondary input device 26 is a three degree of freedom device and the primary input device 22 is a six degree of freedom device, the mentoring guidance in the form of recorded movements of the three degree of freedom device may be translated into haptic guidance in the form of equivalent movement of the six degree of freedom device that achieves the same movement of the medical instrument attached to the teleoperational assembly.

Figure 6:
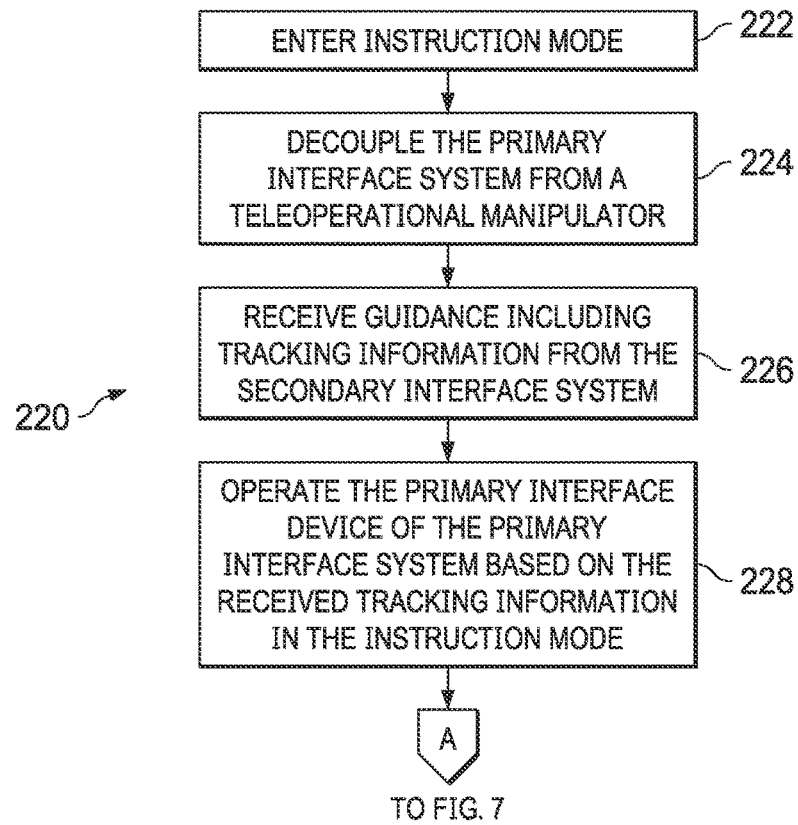
FIG. 6 is a flowchart illustrating a method for providing guidance to an operator of a primary interface system according to some embodiments.

FIG. 6 is a flowchart illustrating in greater detail a method 220 that further describes an embodiment of the processes 206, 208 for receiving guidance from the secondary interface system and providing haptic guidance through the primary interface system. At a process 222, the primary interface system enters an instruction mode. For example the primary interface system 12 may enter an instruction mode based on an initiation command issued from the primary interface system 12, an initiation command issued from the secondary interface system 14, or from the control system 16 based on a condition such as a detected error, an instruction segment of a simulation program, a trigger from the teleoperational constraint source, or any other predetermined condition. A pre-instruction mode orientation and position of the primary input devices may be recorded before the instruction mode is initiated, so that the primary input devices may be returned to the pre-instruction mode orientation when exiting the instruction mode.

At a process 224, the primary interface system is in a decoupled state decoupled from the teleoperational assembly. For example, the primary interface system 104 becomes decoupled from the teleoperational assembly (e.g., teleoperational assembly 102) such that the primary input devices 158 do not control movement of the teleoperational assembly 102 or the instrument systems 124, 125. Thus, in the instruction mode, the primary input devices may be moved by the operator of the primary interface system 104 or by control system 108 in response to received guidance from the secondary interface system 106 without causing motion of components that are in or in the vicinity of the patient.

At a process 226, guidance including tracking information is received from the secondary interface system. For example, the guidance received at process 206 may include tracking information including recorded movements and/or trajectories of the secondary input device of the secondary interface system 106. Other guidance information such as audio information from the mentor, graphical information such as virtual or "ghosted" instrument images overlayed on the primary display system 20, 156 (and optionally displayed on the secondary display system 24), textual information, or other instructions from the mentor may be received from the secondary interface system 106.

At a process 228, the primary interface device is operated based on the received tracking information while in the instruction mode. For example, the received tracking information and any other guidance information received from the secondary interface system 106 may be used to generate the haptic guidance or other instructive guidance for the primary interface system. In some examples, the haptic guidance may operate the primary input devices 158 with movements that replicate the tracking information. Optionally, when exiting the instruction mode, the primary input devices 158 may be returned to the pre-instruction mode position and orientation.

Figure 7:
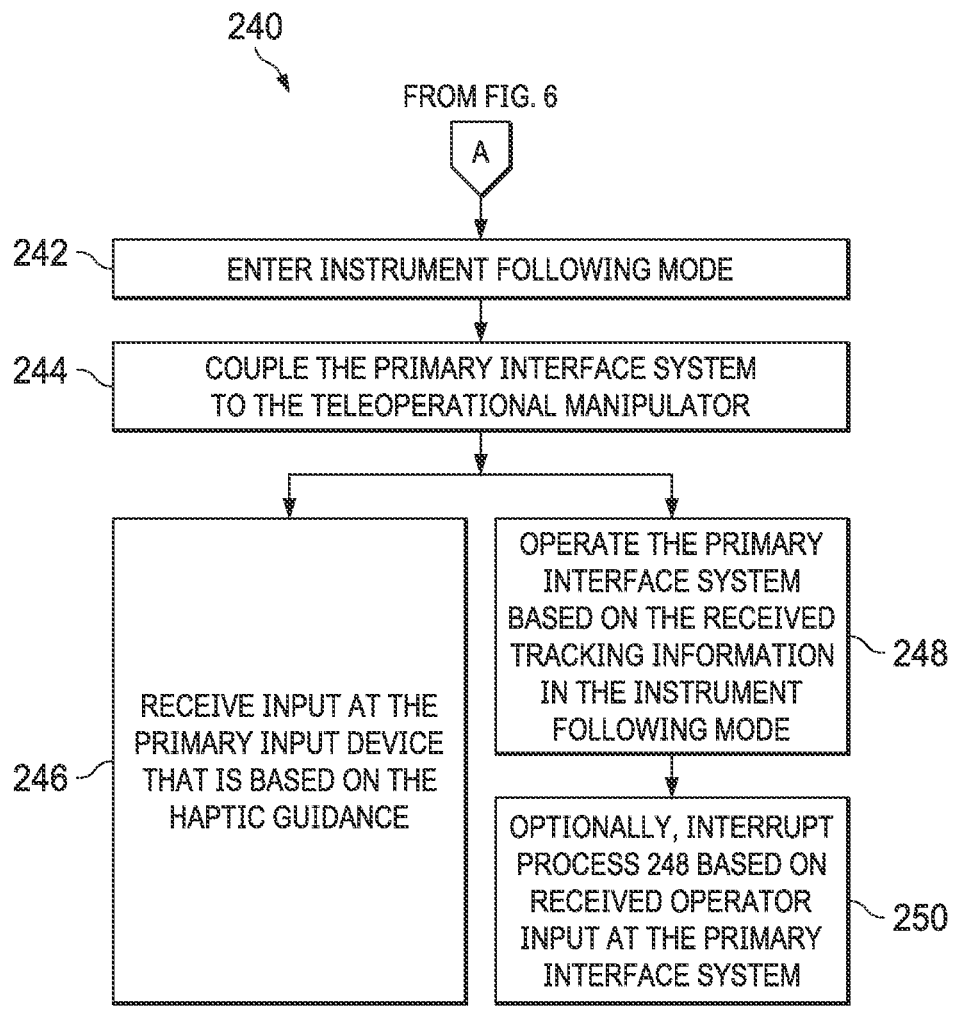
FIG. 7 is a flowchart illustrating a method for operating a teleoperational manipulator assembly according to some embodiments.

FIG. 7 is a flowchart illustrating in greater detail a method 240 that may follow a process 228. With the method 240, operator of the primary interface system may choose to exit the instruction mode after receiving visual and tactile instruction and may implement the guidance from the secondary interface system through the teleoperational assembly. At a process 242, the primary interface system enters an instrument following mode. For example, the operator of the primary interface system 104 may exit the instruction mode and enter an instrument following mode. At a process 244, the primary interface system transitions to a coupled state in which the primary interface system is coupled to the teleoperational assembly and or teleoperated instruments. For example, in the instrument following mode, a medical instrument 124 coupled to the teleoperational assembly 102 responds to movement of the primary input devices 158.

At a process 246, input is received at the primary input devices 158 to implement the guidance from the secondary interface system 106. In some embodiments, the operator of the primary interface system 104, after receiving the visual and tactile guidance from the secondary interface system 106, may directly operate the primary interface system based on the guidance. For example, the operator may repeat the movements and trajectories of the primary input devices 158 that were provided in the haptic guidance, thus controlling the primary input devices 158 to perform the instructed procedure on the patient. In the instrument following mode, the movements and trajectories of the primary input devices 158 will result in corresponding movement of the medical instruments controlled by the primary input devices.

Additionally or alternatively, in some embodiments, the operator of the primary interface system may supervise the automated implementation of the guidance and may interrupt the implementation of the guidance. At a process 248, the primary interface device is operated based on the received tracking information. For example, movement of the primary input device 158 may be driven by the received tracking information without the direct control of the operator at the primary input device 158. The primary input device 158 may be moved under the control of the primary control system 108 to follow the tracking information in the guidance received from the secondary interface system. While the primary input devices 158 are being moved, the operator may not be touching the primary input device 158.

At a process 250, the process 248 may be interrupted based on a received operator input at the primary interface system. For example, when the primary control system 108 drives the motion of the primary input device 158, safety precautions may be implemented to ensure that the operator of the primary interface system 104 is observing the procedure and has the ability to abort the automated procedure or assume control of the primary input device 158 at any time. If the operator of the primary interface system 104 decides to resume control of the primary input device 158, the operator may abort the automated movement of the device 158 and may re-engage with the primary input device 158 to control the medical instrument and teleoperational assembly. In some examples, the automated motion of the primary input device may be interrupted by overpowering primary input device 158 such as by changing a grip orientation or position.

Figure 8:
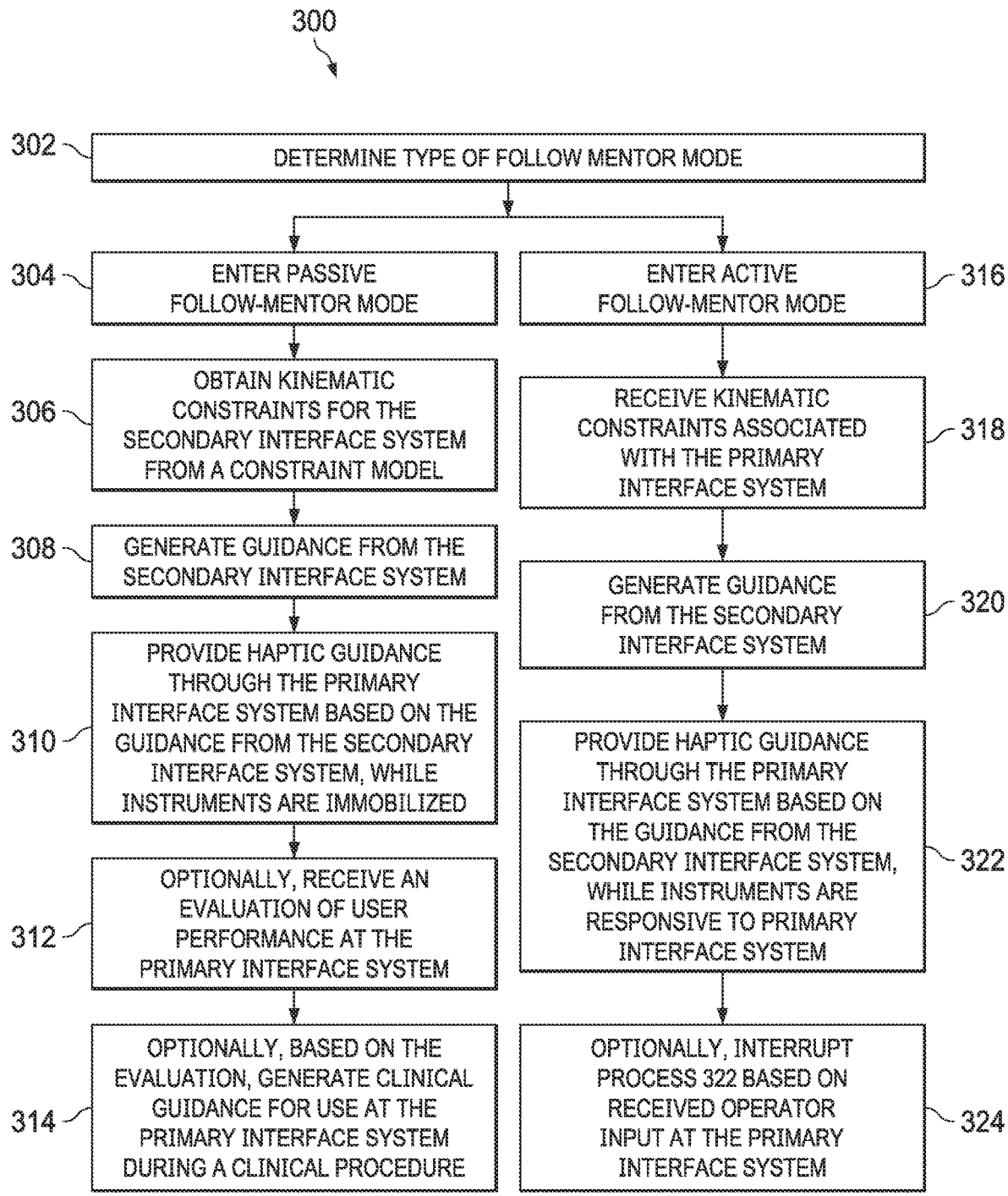
FIG. 8 is a flowchart illustrating a method for providing guidance through a primary interface system.

FIG. 8 is a flowchart a method 300 for providing guidance through a primary interface system. With the method 300, guidance may be delivered in the form of a passive follow-mentor mode or an active follow-mentor mode. In the passive follow mentor mode, a mentor at the secondary interface system may provide guidance in the form of training routines, remedial activities, or practice sessions that allow a mentee at the primary interface system to follow mentor guidance via the primary interface device, without moving instruments in a patient environment. In the active follow-mentor mode, a mentor at the secondary interface system may provide guidance in the form of training routines, remedial activities, or practice sessions that allow a mentee at the primary interface system to follow mentor guidance via the primary interface device, while moving instruments in a patient environment. At a process 302, the primary interface system enters a follow mentor mode. In some embodiments, the guidance mode, including the type of follow mentor mode may be indicated, for example on the displays 20, 24.

At a process 304, the follow mentor mode is a passive follow-mentor mode with optional guidance generated for use in a clinical procedure. At a process 306, kinematic constraints are obtained for the secondary interface system 14 from a constraint model. The constraint model may be obtained from the teleoperational constraint source 18 and may include an anatomic model generated from preoperative or intraoperative patient imaging (e.g. a CT based three-dimensional model) and known kinematic information about a teleoperational manipulator system and primary interface system that a mentee at the primary interface system will be operating. Alternatively or additionally, the constraint model may include a standard (e.g., not patient-specific) anatomic model obtained from a library of standard models at the teleoperational constraint source 18. The model may be selected based on factors such as patient weight, patient gender, procedure type.

At a process 308, the secondary interface system is used by the mentor to generate guidance for performing a procedure such as a training routine, remedial activity, or practice session. For example, the mentor may move the secondary input device 26 to simulate the performance of a medical procedure, a corrective action, a training technique, an exploration, or other action. The movements of the secondary input device 26 may be recorded as mentor guidance. The guidance generated by the mentor, in the form of recorded movements, trajectories, or other tracked information of the secondary input device 26, may be subject to the kinematic constraints from the constraint model. The recorded movements and trajectories may include positions, orientations, spatial displacements, velocities, accelerations, and other parameters associated with the movement of the secondary input device 26 by the mentor. The mentor guidance may also include verbal commentary and annotations to image data.

At a process 310, the guidance generated by the secondary interface system is used to provide haptic guidance through the primary interface system. While the haptic guidance is provided in the passive follow-mentor mode, the instruments controlled by the primary input device 22 in an instrument following mode are decoupled from the primary input device 22 and are immobilized. For example, the mentoring guidance may be communicated, for example through the control systems 16, 17, to the primary interface system 12. The mentor guidance may be transmitted as control data, image data, and/or audio data to the primary interface system 12. The haptic guidance generated at the primary interface system 12 may be in the form of constrained movements of the primary input device 22 based on the movements of the secondary input device 26. The haptic guidance may include displacements, changes in orientation, trajectories, forces, accelerations, velocities, or other motion parameters delivered through the primary input device 22 that correspond to or match the movements of the secondary input device 26 used to generate the mentor guidance. The operator of the primary interface system 12 may engage (e.g., grip, hold, manipulate) the primary input device 22 as the haptic guidance is delivered allowing the operator's hands to experience the haptic guided movement of the input device 22 without causing movement of the teleoperational instrument. The primary input device 22 may be constrained to move in accordance with the haptic guidance as the operator engages the primary input device and may resist any forces applied by the operator that are contrary to the haptic guidance. For example, the haptic guidance may include constrained trajectory guidance that limits movement of the primary input device 22 within a constrained trajectory of motion. The haptic guidance may train the user to perform the procedure using the same sequence of motions, forces, trajectories, displacements, rotations or other motion parameters provided by the mentor through the secondary interface system 14. After the haptic guidance is delivered via the primary input device 22, the primary input device may be returned to the same position and orientation that it was in prior to initiation of the haptic guidance. In some examples, where the primary input device 22 and the secondary input device 26 have the same structure and configuration, the haptic guidance may be movement of the primary input device 22 that replicates the movement of the secondary input device 26 to achieve the same medical instrument motion. In other examples, where the primary input device 22 and the secondary input device 26 have different structures and configurations, the mentor guidance may be translated to the primary interface system 12 so that the same medical instrument motion achieved by the mentor guidance may be achieved using the secondary input device 26. For example, if the secondary input device 26 is a three degree of freedom device and the primary input device 22 is a six degree of freedom device, the mentoring guidance in the form of recorded movements of the three degree of freedom device may be translated into haptic guidance in the form of equivalent movement of the six degree of freedom device that achieves the same movement of the medical instrument attached to the teleoperational assembly.

At an optional process 312, an evaluation of the mentee's performance of the procedures, routines, techniques or other actions guided by the haptic guidance may be received. The mentor, via the secondary interface system 14, may evaluate the mentee's performance at the primary interface system 12. In some embodiments, the mentor may evaluate which action in a series of repeated mentee actions was closest to an ideal action or may evaluate a location in the patient anatomy selected by the mentee for performing an action. For example, the mentor may indicate a suture line and the mentee may practice throwing sutures over the indicated suture line. The practice sutures may be evaluated by the mentee.

At an optional process 314, clinical guidance for use at the primary interface system during a clinical procedure may be generated based on the evaluation. After evaluating the mentee actions performed while the surgical instruments are decoupled from the primary input device 22, clinical guidance may be generated to assist the mentee during a clinical procedure in an instrument following mode when the surgical instruments are commanded by the motion of the primary input device 22. Clinical guidance may, for example, take the form of visual aids, haptic nudging of the primary input device 22, and/or haptic fencing that limits movement of the primary input device 22. The clinical guidance may be generated based on the evaluation of the mentee training actions while the instruments are decoupled. For example, the based on an evaluation of a series of practice sutures, clinical guidance may generate haptic boundaries or image-based visual boundaries associated with optimal suturing. The clinical guidance may guide the mentee to suture within the boundaries using the instruments in instrument following mode.

At the process 316, the follow mentor mode is an active follow-mentor mode. At a process 318, kinematic constraints associated with the primary interface system 12 are received at the secondary interface system 14. The teleoperational constraint source 18 may provide the kinematic constraints associated with the primary interface system 12 and the teleoperational manipulator assembly while the teleoperational manipulator and attached instruments are controlled by the primary interface system 12.

At a process 320, the secondary interface system is used by the mentor to generate guidance for performing a clinical activity. For example, the mentor may move the secondary input device 26 to simulate the performance of the clinical activity. The movements of the secondary input device 26 may be recorded as mentor guidance. The guidance generated by the mentor, in the form of recorded movements, trajectories, or other tracked information of the secondary input device 26, may be subject to the kinematic constraints associated with the primary interface system 12. The recorded movements and trajectories may include positions, orientations, spatial displacements, velocities, accelerations, and other parameters associated with the movement of the secondary input device 26 by the mentor. The mentor guidance may also include verbal commentary and annotations to image data.

At a process 322, the guidance generated by the secondary interface system is used to provide haptic guidance through the primary interface system 12. While the haptic guidance is provided in the active follow-mentor mode, the surgical instruments may be in an instrument following mode under the control of the primary input device 22. The mentor guidance may be communicated, for example through the control systems 16, 17, to the primary interface system 12. The mentor guidance may be transmitted as control data, image data, and/or audio data to the primary interface system 12. The haptic guidance generated at the primary interface system 12 may be in the form of constrained movements of the primary input device 22 based on the movements of the secondary input device 26. The haptic guidance may include displacements, changes in orientation, trajectories, forces, accelerations, velocities, or other motion parameters delivered through the primary input device 22 that correspond to or match the movements of the secondary input device 26 used to generate the mentor guidance. The operator of the primary interface system 12 may engage (e.g., grip, hold, manipulate) the primary input device 22 as the haptic guidance is delivered allowing the operator's hands to experience the haptic guided movement of the input device 22 while the input device 22 causes movement of the teleoperational instrument. The primary input device 22 may be constrained to move in accordance with the haptic guidance as the operator engages the primary input device 22 and may resist any forces applied by the operator that are contrary to the haptic guidance. In some embodiments, the haptic guidance at the primary interface system generated from the secondary interface system guidance may be modified. For example, the haptic guidance at the primary interface system may be dampened, slower, or intermittent, as compared to the guidance generated from the secondary interface system. In some examples, the haptic guidance may be a dampened "nudging" guidance which urges the primary input device 22 in accordance with the mentor guidance, without generating identical motion of the primary input device as was performed at the secondary input device.

At a process 324, the process 322 may be interrupted based on a received operator input at the primary interface system. For example, when the primary input device 22 (and consequently the commanded surgical instrument) moves under the control of the haptic guidance, safety precautions may be implemented to ensure that an operator of the primary interface system 12 is observing the procedure and has the ability to abort the automated procedure or assume control of the primary input device 22 at any time. If the operator of the primary interface system 12 decides to resume control of the primary input device 22, the operator may abort the guided movement of the device 22 and may re-engage with the primary input device 22 to fully control the medical instrument and teleoperational assembly. In some examples, the guided motion of the primary input device may be interrupted by overpowering primary input device 22 such as by changing a grip orientation or position.

Elements described in detail with reference to one embodiment, implementation, or application optionally may be included, whenever practical, in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

Any alterations and further modifications to the described devices, systems, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately.

Various systems and portions of systems have been described in terms of their state in three-dimensional space. As used herein, the term "position" refers to the location of an object or a portion of an object in a three-dimensional space (e.g., three degrees of translational freedom along Cartesian X, Y, Z coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom).

Although some of the examples described herein refer to surgical procedures or instruments, or medical procedures and medical instruments, the techniques disclosed optionally apply to non-medical procedures and non-medical instruments. For example, the instruments, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, and training medical or non-medical personnel. Additional example applications include use for procedures on tissue removed from human or animal anatomies (without return to a human or animal anatomy) and performing procedures on human or animal cadavers. Further, these techniques can also be used for surgical and nonsurgical medical treatment or diagnosis procedures.

A computer is a machine that follows programmed instructions to perform mathematical or logical functions on input information to produce processed output information. A computer includes a logic unit that performs the mathematical or logical functions, and memory that stores the programmed instructions, the input information, and the output information. The term "computer" and similar terms, such as "processor" or "controller" or "control system," are analogous.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. A system comprising:
   a primary interface system, the primary interface system including a primary display and a primary input device;
   a secondary interface system, the secondary interface system including a secondary display and a secondary input device;
   a control system in communication with the primary interface system and the secondary interface system, the control system including a processing unit including one or more processors, and wherein the processing unit is configured to:

receive a plurality of teleoperational kinematic constraints for the primary input device;

generate a plurality of simulated kinematic constraints, mimicking the teleoperational kinematic constraints, for the secondary input device;

decouple the primary interface system from control of a teleoperated instrument based on receipt of an initiation command;

receive guidance information from the secondary input device;

provide haptic guidance through the primary input device based on the guidance information from the secondary input device while the primary interface system is decoupled from control of the teleoperated instrument; and couple the primary interface system to control of the teleoperated instrument based on receipt of an exit command.

2. The system of claim 1 wherein the processing unit is further configured to:

provide visual guidance through the primary display, wherein the visual guidance includes virtually rendered instrument images.

3. The system of claim 1 wherein the haptic guidance includes an orientation of the primary input device based on the guidance information or includes a motion of the primary input device based on the guidance information.

4. The system of claim 1 wherein the guidance information includes recorded tracking information from movement of the secondary input device.

5. The system of claim 1 wherein the haptic guidance includes constrained trajectory guidance.

6. The system of claim 5 wherein the haptic guidance includes movement of the primary input device based on the constrained trajectory guidance.

7. The system of claim 6, wherein the constrained trajectory guidance includes nudging haptic.

8. The system of claim 1 wherein the guidance information includes graphics overlayed on imaging information displayed on the primary display.

9. The system of claim 1 wherein following receipt of the exit command, the processing unit is configured to operate the primary input device to control the teleoperated instrument responsive to an operator input at the primary input device that is based on the guidance information.

10. The system of claim 1 wherein following receipt of the exit command, the processing unit is configured to operate the primary input device to control the teleoperated instrument based on the guidance information without operator control of the primary input device.

11. The system of claim 1 wherein following receipt of the exit command, movement of the primary input device tracks the haptic guidance while controlling movement of the teleoperated instrument.

12. The system of claim 11 wherein the processing unit is further configured to generate the movement of the primary input device that tracks the haptic guidance.

13. The system of claim 1 wherein the processing unit is further configured to receive a haptic guidance engagement indication from the primary interface system.

14. The system of claim 1 further comprising a teleoperational constraint source, wherein the teleoperational kinematic constraints are generated by the teleoperational constraint source.

15. The system of claim 14 wherein the teleoperational constraint source is a sensor in a teleoperational manipulator system.

16. The system of claim 14 wherein the teleoperational constraint source is a sensor in a teleoperated instrument.

17. The system of claim 14 wherein the teleoperational constraint source is a teleoperational manipulator simulator.

18. The system of claim 1 wherein the processing unit is further configured to receive primary imaging data for display on the primary display and generate secondary imaging data from the primary imaging data for presentation on the secondary display.

19. The system of claim 18 wherein an image generated from the secondary imaging data has a lower resolution than an image generated from the primary imaging data.

20. The system of claim 18 wherein the primary imaging data includes virtual position information for presentation on the secondary display.

* * * * *